United States Patent
Yang (10) Patent No.: US 10,547,920 B2
(45) Date of Patent: Jan. 28, 2020

(54) METHOD AND APPARATUS FOR ESTABLISHING TRANSMISSION PATH FOR EXCHANGING OPTICAL SIGNAL

(71) Applicant: Huawei Technologies Co., Ltd., Shenzhen (CN)

(72) Inventor: Xiaoling Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/796,312

(22) Filed: Oct. 27, 2017

(65) Prior Publication Data
US 2018/0054664 A1 Feb. 22, 2018

Related U.S. Application Data

(63) Continuation of application No. PCT/CN2015/077488, filed on Apr. 27, 2015.

(51) Int. Cl.
*G02B 6/35* (2006.01)
*H04Q 11/00* (2006.01)

(52) U.S. Cl.
CPC .......... *H04Q 11/0005* (2013.01); *G02B 6/35* (2013.01); *H04Q 2011/0013* (2013.01); *H04Q 2011/0049* (2013.01); *H04Q 2011/0058* (2013.01)

(58) Field of Classification Search
None
See application file for complete search history.

(56) References Cited

U.S. PATENT DOCUMENTS

| 6,728,016 | B1 | 4/2004 | Hunt et al. | |
| 8,638,801 | B2* | 1/2014 | Sato | H04J 14/0212 370/395.51 |
| 2004/0120714 | A1* | 6/2004 | Fukashiro | H04Q 11/0005 398/45 |
| 2004/0258406 | A1 | 12/2004 | Kumaran et al. | |
| 2009/0067837 | A1* | 3/2009 | Hesse | H04L 47/56 398/51 |

(Continued)

FOREIGN PATENT DOCUMENTS

| CN | 1392696 A | 1/2003 |
| CN | 1540886 A | 10/2004 |

(Continued)

OTHER PUBLICATIONS

Machine Translation and Abstract of Chinese Publication No. CN1540886, Oct. 27, 2004, 19 pages.

(Continued)

*Primary Examiner* — Michelle R Connelly
(74) *Attorney, Agent, or Firm* — Conley Rose, P.C.

(57) ABSTRACT

A method and an apparatus for establishing a transmission path for exchanging an optical signal, where a gate device is disposed in front of an optical switch matrix, where the optical signal reaches the optical switch matrix through the gate device. A working state of the gate device and a working state of a first optical switch used for transmitting the optical signal in the optical switch matrix are adjusted in a time sequence such that when a transmission path used for transmitting the optical signal in the optical switch matrix is established, dynamic crosstalk can be reduced, and communication quality is improved.

10 Claims, 9 Drawing Sheets

(56) References Cited

U.S. PATENT DOCUMENTS

2012/0099857 A1    4/2012  Zhang et al.
2016/0337729 A1*  11/2016  Li .................... H04Q 11/0005
2016/0344481 A1*  11/2016  Vassilieva ........... H04J 14/0221

FOREIGN PATENT DOCUMENTS

| CN | 101043271 A | 9/2007 |
| CN | 101127570 A | 2/2008 |
| CN | 101594184 A | 12/2009 |
| CN | 101621718 A | 1/2010 |

OTHER PUBLICATIONS

Machine Translation and Abstract of Chinese Publication No. CN101127570, Feb. 20, 2008, 10 pages.
Foreign Communication From a Counterpart Application, Chinese Application No. 201580077680.X, Chinese Office Action dated Feb. 19, 2019, 5 pages.
Machine Translation and Abstract of Chinese Publication No. CN1392696, Jan. 22, 2003, 12 pages.
Machine Translation and Abstract of Chinese Publication No. CN101043271, Sep. 26, 2007, 24 pages.
Machine Translation and Abstract of Chinese Publication No. CN101621718, Jan. 6, 2010, 15 pages.
Foreign Communication From a Counterpart Application, PCT Application No. PCT/CN2015/077488, English Translation of International Search Report dated Jan. 27, 2016, 2 pages.
Foreign Communication From a Counterpart Application, PCT Application No. PCT/CN2015/077488, English Translation of Written Opinion dated Jan. 27, 2016, 5 pages.

* cited by examiner

METHOD AND APPARATUS FOR ESTABLISHING TRANSMISSION PATH FOR EXCHANGING OPTICAL SIGNAL

CROSS-REFERENCE TO RELATED APPLICATIONS

This application is a continuation of International Patent Application No. PCT/CN2015/077488 filed on Apr. 27, 2015, which is hereby incorporated by reference in its entirety.

TECHNICAL FIELD

Embodiments of the present disclosure relate to communications technologies, and in particular, to a method and an apparatus for establishing a transmission path for exchanging an optical signal.

BACKGROUND

Internet services grow explosively in recent years. People have more requirements on a network, and put forward new requirements on networking manners, node designs, management, and control of the entire network. In this case, an intelligent network architecture, that is, an automatically switched optical network (ASON) has become a popular research topic currently.

A core node of the ASON is constituted by an optical cross-connect (OXC) device. The ASON may be managed flexibly and effectively using the OXC. Further, an optical switch matrix is a core part of the OXC. The optical switch matrix may implement functions such as dynamic optical transmission path management, ASON fail-safe, and dynamic wavelength allocation. This is particularly meaningful for resolving wavelength contention in a current complex network, improving a wavelength reuse rate, and flexibly configuring the ASON. The optical switch matrix is usually constituted by multiple optical switches in a topology.

Due to process limitation and the like, regardless of which state an optical switch works in, it is impossible for 100% of optical signals that are input from an input port of the optical switch to be output to expected output ports, and some of the optical signals are output to other output ports of the optical switch. In this case, from a perspective of another input port, these optical signals are crosstalk optical signals. During actual application, when a transmission path in an optical switch matrix is switched, relatively strong instantaneous crosstalk optical signals (that is, dynamic crosstalk) appear at some output ports of the optical switch matrix in the transmission path switching process, degrading communication quality.

SUMMARY

Embodiments of the present disclosure provide a method and an apparatus for establishing a transmission path for exchanging an optical signal such that when a transmission path used for transmitting an optical signal in an optical switch matrix is being established, dynamic crosstalk is reduced, and communication quality is improved.

According to a first aspect, an embodiment of the present disclosure provides an apparatus for establishing a transmission path for exchanging an optical signal configured to establish, by changing a state of an optical switch in an optical switch matrix, the transmission path for exchanging the optical signal, where the apparatus for establishing a transmission path includes an external input port, where the external input port is configured to input the optical signal, an external output port, where the external output port is connected to an internal output port of the optical switch matrix and is configured to output an exchanged optical signal, a gate device, where an input port of the gate device is connected to the external input port, and an output port of the gate device is connected to an internal input port of the optical switch matrix, the optical signal is prohibited from passing through the gate device when the gate device works in a close state, and the optical signal is allowed to pass through the gate device when the gate device works in an open state, a controller, where an input port of the controller is connected to the external input port and is configured to obtain the transmission path of the optical signal in the optical switch matrix according to the external input port and the external output port, and the optical switch matrix, including the internal input port, a first optical switch, and the internal output port, where the first optical switch is an optical switch on the transmission path, and the optical switch matrix is configured to exchange the optical signal and obtain the exchanged optical signal. The controller is further configured to generate a first control signal for the gate device, where the first control signal is used to control the gate device to work in the close state, generate a second control signal for the first optical switch, where the second control signal is used to control the first optical switch to work in an expected state, and generate a third control signal for the gate device, where the third control signal is used to control the gate device to work in the open state.

According to a second aspect, an embodiment of the present disclosure provides a method for establishing a transmission path for exchanging an optical signal, used to establish, by changing a state of an optical switch in an optical switch matrix, the transmission path for exchanging the optical signal, where the optical signal reaches the optical switch matrix through a gate device, the optical signal is prohibited from passing through the gate device when the gate device works in a close state, and the optical signal is allowed to pass through the gate device when the gate device works in an open state, and the method for establishing a transmission path includes obtaining, according to an external input port and an external output port of the optical signal, the transmission path of the optical signal in the optical switch matrix and a first optical switch used on the transmission path, generating a first control signal for the gate device, where the first control signal is used to control the gate device to work in the close state, generating a second control signal for the first optical switch, where the second control signal is used to control the first optical switch to work in an expected state, and generating a third control signal for the gate device, where the third control signal is used to control the gate device to work in the open state.

According to a third aspect, an embodiment of the present disclosure provides an apparatus for establishing a transmission path for exchanging an optical signal, used to establish, by changing a state of an optical switch in an optical switch matrix, the transmission path for exchanging the optical signal, where the optical signal reaches the optical switch matrix through a gate device, the optical signal is prohibited from passing through the gate device when the gate device works in a close state, and the optical signal is allowed to pass through the gate device when the gate device works in an open state, and the apparatus for establishing a transmission path includes a processor and a memory, where the memory is configured to store an execution instruction, and when the apparatus for establishing a transmission path runs, the processor communicates with the memory, and the processor calls the execution instruction in the memory to perform the operations of obtaining, according to an external input port and an external output port of the optical signal, the transmission path of the optical signal in the optical switch matrix and a first optical switch used on the transmission path, generating a first control signal for the gate device, where the first control signal is used to control the gate device to work in the close state, generating a second control signal for the first optical switch, where the second control signal is used to control the first optical switch to work in an expected state, and generating a third control signal for the gate device, where the third control signal is used to control the gate device to work in the open state.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Currently, data exchange is completed using an electrical switch. Electrical exchange means converting a received data packet into an electrical signal by means of optical-to-electrical conversion, parsing the electrical signal to obtain a destination address of the data packet, then, exchanging the data packet to an output port to which the destination address points, and after the electrical signal is converted into an optical signal by means of electrical-to-optical conversion, sending the optical signal to complete an exchange process.

However, due to limitations of technologies such as a backplane and energy consumption, a conventional electrical switch cannot meet a requirement of a continuously increasing exchange capacity. In this case, an optical switch draws more attention because of features such as low energy consumption and a large capacity of the optical switch. The industry starts to research how to apply the optical switch to a switching network.

An optical switching technology is an optical switching technology in which an optical signal is transparently exchanged from an input port to any output port using an M×N optical switch matrix. Both M and N are natural numbers, M represents a quantity of input ports of the optical switch matrix, and N represents a quantity of output ports of the optical switch matrix. The optical switching technology may be classified into optical-circuit switching, optical burst switching, and optical-packet switching according to different switching granularities. During actual application, different optical switching solutions may be selected according to different application scenarios.

A core component of an optical switching apparatus is an optical switch matrix. An M×N optical switch matrix usually includes multiple 2×2 optical switches in a topology.

Figure 1:
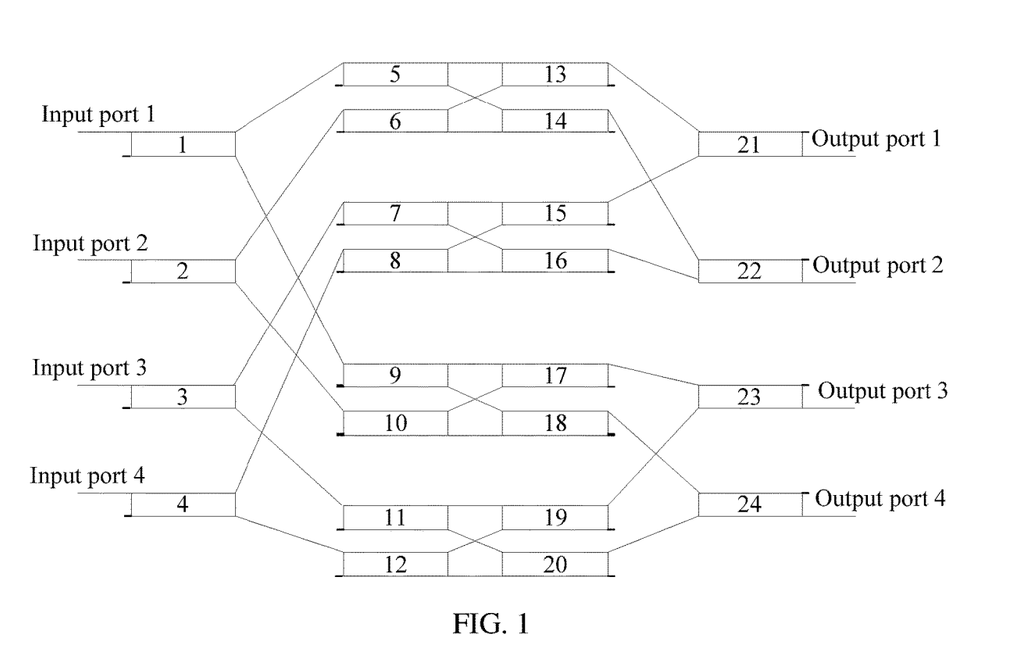
FIG. 1 is an example of a diagram of a 4×4 optical switch matrix in a Banyan structure.

FIG. 1 shows a 4×4 optical switch matrix that includes 24 optical switches (i.e., 1 to 24 devices in FIG. 1) in a Banyan structure. Each 2×2 optical switch is used as a 1×2 (optical switches 1-12) or 2×1 (optical switches 13-24) optical switch for mutual connection.

Figure 2:
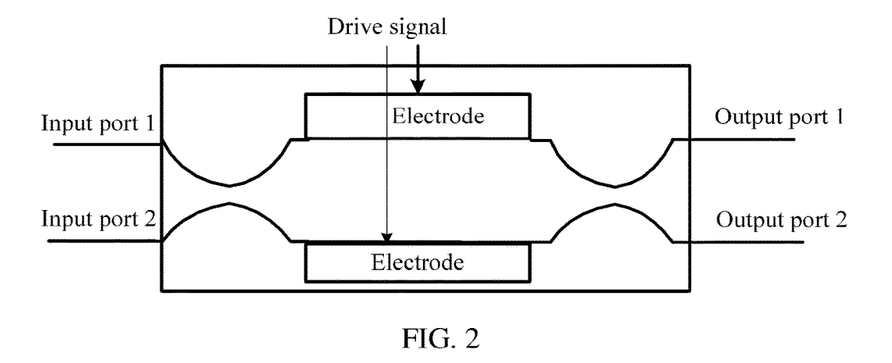
FIG. 2 is an example of a structural diagram of a 2×2 optical switch in a Mach-Zehnder Interferometer (MZI) structure.
Figure 3:
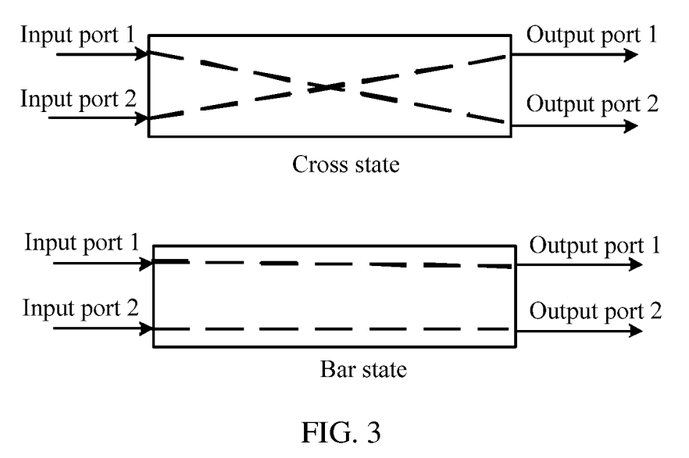
FIG. 3 is a schematic diagram of two working states of an optical switch.

FIG. 2 shows a commonly used 2×2 optical switch in an MZI structure. A working principle of the 2×2 optical switch is that the optical switch is in different working states by applying different drive signals to two electrodes. One of the two main working states of the optical switch is referred to as a cross state, and the other is a bar state. As shown in FIG. 3, in the cross state, the optical switch establishes a transmission path from an input port 1 to an output port 2 and a transmission path from an input port 2 to an output port 1. In the bar state, the optical switch establishes a transmission path from the input port 1 to the output port 1 and a transmission path from the input port 2 to the output port 2. A transmission path is established to apply a suitable drive signal to each optical switch such that the optical switch works in the cross state or the bar state to establish a transmission path between an input port and an output port of an optical switch matrix.

Figure 4:
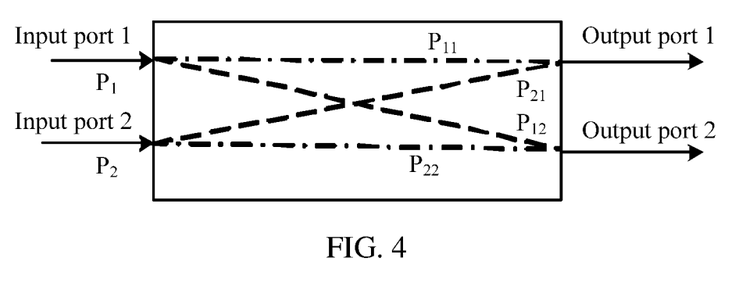
FIG. 4 is a schematic diagram of crosstalk generated by a 2×2 optical switch working in a cross state.

As shown in FIG. 4, a 2×2 optical switch works in a cross state, an optical signal input from the input port 1 is P1, and an optical signal input from the input port 2 is P2. It is impossible for all optical signals at the input port 1 to be transmitted to the output port 2, most optical signals P12 (a power of which is, for example, −5 decibel-milliwatts (dBm)) are transmitted to the output port 2, and a small part of signals P11 (a power of which is, for example, −20 dBm) are transmitted to the output port 1. This phenomenon also occurs on optical signals that are input from the input port 2. Therefore, most part (P21) of the optical signals that are output from the output port 1 are from the input port 2, and a small part (P11) of the optical signals are from the input port 1. Most part (P12) of the optical signals that are output from the output port 2 are from the input port 1, and a small part (P22) of the optical signals are from the input port 2. For a receive end, the P21 and the P12 at the output port are effective optical signals, and the P11 and the P22 are crosstalk optical signals. If the P11 or the P22 is excessively large, the P21 and the P12 cannot be correctly received. Crosstalk is an important indicator to measure performance of the optical switch. Magnitude of crosstalk is measured using a ratio of a power of an effective optical signal (such as P12) from an expected input port to a power of a crosstalk optical signal (such as P22) from another input port.

When multiple optical switches form an optical switch matrix, a crosstalk optical signal at an output port of each optical switch is continuously transmitted along a topology path in the optical switch matrix, and strength of the crosstalk optical signal gradually decreases. Therefore, in an optical switch matrix, a crosstalk level is usually used to accurately measure crosstalk magnitude, and a higher level indicates smaller crosstalk. Level-n (n is a positive integer) crosstalk is defined as: A signal obtained after an effective optical signal is transmitted to an unexpected output port through one optical switch becomes level-1 crosstalk, a signal obtained after an level-n crosstalk signal is transmitted to an unexpected output port through one optical switch becomes level-(n+1) crosstalk, and if an level-n crosstalk signal is transmitted to an expected output port through one optical switch, the signal is still level-n crosstalk. For the optical switch matrix, a crosstalk optical signal at an output port of the optical switch matrix is an overlap of several crosstalk optical signals that are at different levels, and may be further classified into static crosstalk and dynamic crosstalk. The following separately describes the static crosstalk and the dynamic crosstalk in the optical switch matrix.

The static crosstalk refers to a crosstalk signal that appears at the output port of the optical switch matrix when working states of all optical switches in the optical switch matrix do not change. Strength of a crosstalk optical signal at each output port may be determined when a state of each optical switch is determined. Magnitude of static crosstalk is related to magnitude of crosstalk of a single optical switch and a currently established transmission path.

Figure 5:
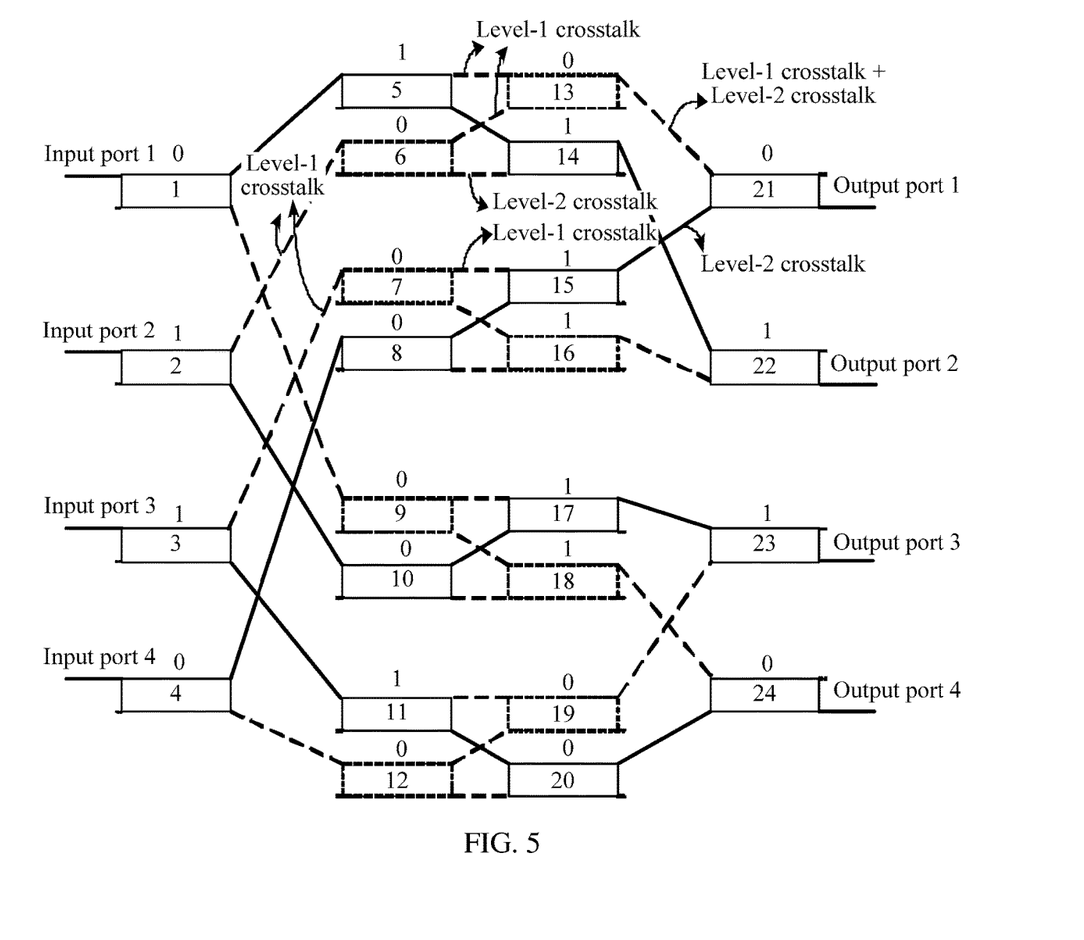
FIG. 5 is a schematic diagram of static crosstalk generated by a 4×4 optical switch matrix.

As shown in FIG. 5, a 4×4 optical switch matrix establishes transmission paths input port 1→output port 2, input port 2→output port 3, input port 3→output port 4, and input port 4→output port 1. The four transmission paths are represented by solid lines, and the other transmission paths are represented by dashed lines. In addition, optical switches configured to establish the four transmission paths are represented by solid-line boxes, and working states of the optical switches are shown by 0 or 1 in FIG. 5. "0" represents that an optical switch works in a bar state, and "1" represents that the optical switch works in a cross state. Other optical switches not configured to establish transmission paths are referred to as idle optical switches (which are represented by dashed-line boxes in FIG. 5). A state of an idle optical switch is randomly the cross state or the bar state. For example, FIG. 5 shows a state of an idle optical switch using an example. Using the output port 1 as an example, an effective optical signal in a signal output from the output port 1 is from an input port 4, and a transmission path of the effective optical signal is optical switch 4→optical switch 8→optical switch 15→optical switch 21. A crosstalk optical signal from the input port 1 is level-2 crosstalk, and a transmission path of the crosstalk optical signal is optical switch 1→optical switch 5→optical switch 13→optical switch 21. A crosstalk optical signal from the input port 2 is level-3 crosstalk, and a transmission path of the crosstalk optical signal is optical switch 2→optical switch 6→optical switch 13→optical switch 21. A crosstalk optical signal from the input port 3 is level-2 crosstalk, and a transmission path of the crosstalk optical signal is optical switch 3→optical switch 7→optical switch 15→optical switch 21. An upper-arm output port of the optical switch 5 shown in FIG. 5 has only level-1 crosstalk, and for the optical switch 13, an upper-arm output port of the optical switch 13 has an overlap of level-1 crosstalk and level-2 crosstalk. Currently, a commonly used method for reducing static crosstalk in an optical switch matrix is to form an optical switch matrix using optical switches in a good topology or is to optimize a state of an idle optical switch.

Figure 6:
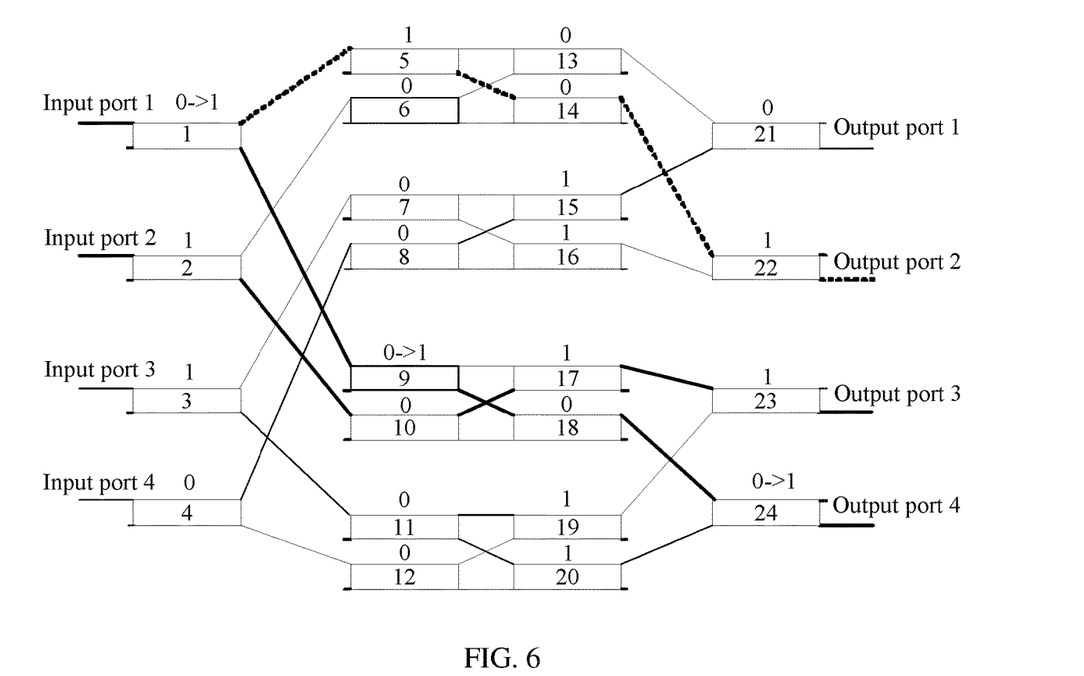
FIG. 6 is a schematic diagram of dynamic crosstalk generated by a 4×4 optical switch matrix.

The dynamic crosstalk is that when a transmission path in an optical switch matrix is switched, relatively strong instantaneous crosstalk optical signals appear at some output ports in the transmission path switching process. FIG. 6 shows an example of generating dynamic crosstalk. As shown in FIG. 6, currently, the optical switch matrix establishes a transmission path from the input port 1 to the output port 2 and a transmission path from the input port 2 to the output port 3. It is assumed that the optical switch 9 is in a bar state, a signal obtained after the optical signal is transmitted from the input port 1 to the output port 3 through optical switch 1→optical switch 9→optical switch 17→optical switch 23 is level-2 crosstalk. If a transmission path from the input port 1 to the output port 4 needs to be established in this case, working states of the optical switch 1, the optical switch 9, and an optical switch 24 need to be adjusted from the bar state to the cross state (i.e., 0→1). A difference exists in performance of the optical switches because of a process, and the working states of these optical switches may not be adjusted at the same time. For example, if the working state adjustment of the optical switch 1 is first completed, and the optical switch 9 is still in the bar state, in this case, approximate level-1 crosstalk from the input port 1 appears at the output port 3. After the working states of the three optical switches are adjusted, crosstalk from the input port 1 is level-2 crosstalk. If the dynamic crosstalk is excessively large, a burst error may occur in the exchanged optical signal, and system performance is affected. Therefore, to reduce dynamic crosstalk is also an important problem in an optical switching system.

Based on the foregoing descriptions, the embodiments of the present disclosure provide a method and an apparatus for establishing a transmission path for exchanging an optical signal. A gate device is disposed in front of an optical switch matrix. That is, an optical signal reaches the optical switch matrix through the gate device. A working state of the gate device and a working state of a first optical switch used for transmitting the optical signal in the optical switch matrix are adjusted in a time sequence such that when a transmission path used for transmitting the optical signal in the optical switch matrix is switched, dynamic crosstalk can be reduced, and communication quality is improved.

Figure 7:
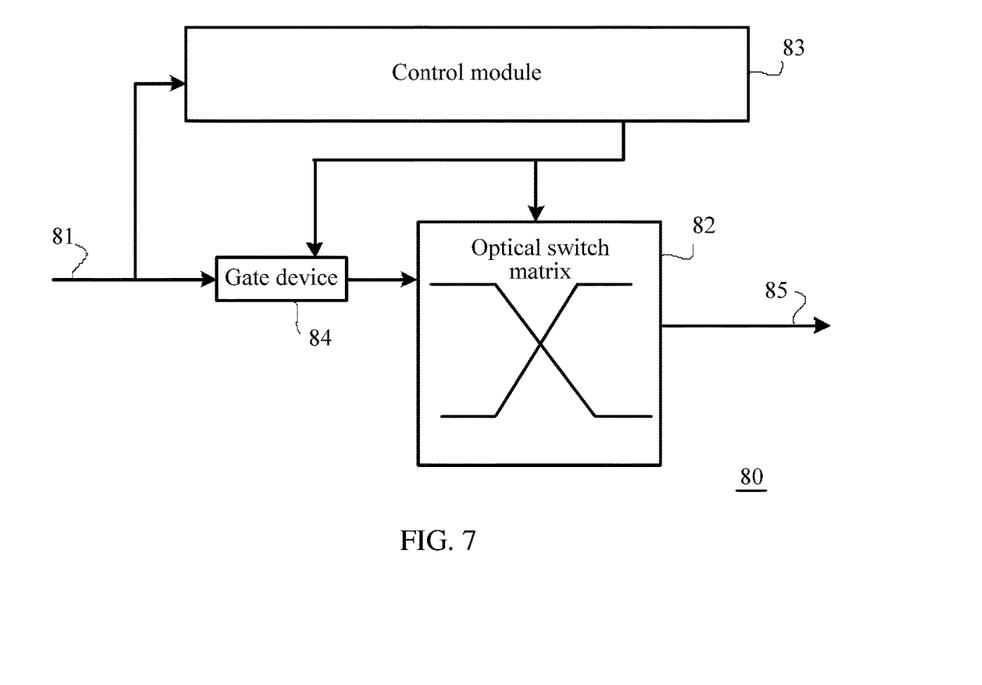
FIG. 7 is a schematic structural diagram of Embodiment 1 of an apparatus for establishing a transmission path according to the present disclosure.

FIG. 7 is a schematic structural diagram of Embodiment 1 of an apparatus 80 for establishing a transmission path according to the present disclosure. This embodiment of the present disclosure provides the apparatus 80 for establishing a transmission path for exchanging an optical signal. A transmission path of an optical signal is established by changing a state of an optical switch in an optical switch matrix. As shown in FIG. 7, the apparatus 80 for establishing a transmission path for exchanging an optical signal includes an external input port 81, an optical switch matrix 82, a control module 83, a gate device 84, and an external output port 85.

The external input port 81 is configured to input an optical signal. The external output port 85 is connected to an internal output port (not shown) of the optical switch matrix 82 and is configured to output an exchanged optical signal. An input port of the gate device 84 is connected to the external input port 81, and an output port of the gate device 84 is connected to an internal input port (not shown) of the optical switch matrix 82. When the gate device 84 works in a close state, the optical signal is prohibited from passing through the gate device 84. When the gate device 84 works in an open state, the optical signal is allowed to pass through the gate device 84. An input port of the control module 83 is connected to the external input port 81 and is configured to obtain the transmission path of the optical signal in the optical switch matrix 82 according to the external input port 81 and the external output port 85. The optical switch matrix 82 includes the internal input port, a first optical switch (not shown), and the internal output port. The first optical switch is an optical switch on the transmission path. The optical switch matrix 82 is configured to exchange the optical signal and obtain the exchanged optical signal. The control module 83 is further configured to generate a first control signal for the gate device 84, where the first control signal is used to control the gate device 84 to work in the close state, generate a second control signal for the first optical switch, where the second control signal is used to control the first optical switch to work in an expected state, and generate a third control signal for the gate device 84, where the third control signal is used to control the gate device 84 to work in the open state.

This embodiment provides a structure of the apparatus 80 for establishing a transmission path for exchanging an optical signal. Before an optical signal from a transmit end, that is, a to-be-exchanged optical signal, is exchanged, the control module 83 completes reading an optical identifier according to the input optical signal, and determines an external output port of the optical signal. Then, the control module 83 calculates a transmission path, and determines a first optical switch used on the transmission path in the optical switch matrix 82. Finally, the control module 83 generates a control signal (including a first control signal, a second control signal, and a third control signal) to control working states of the gate device 84 and the first optical switch in the optical switch matrix 82, thereby establishing a corresponding optical signal transmission path. The optical signal is output through the external output port 85 after passing through the gate device 84 and the transmission path established in the optical switch matrix 82.

Using the apparatus 80 for establishing a transmission path, dynamic crosstalk introduced when a transmission path is established can be reduced. This is described in the following using an example.

For example, the optical switch matrix 82 used in this embodiment of the present disclosure is a structure shown in FIG. 6. Referring to FIG. 6 and FIG. 7, a transmission path from the input port 1 to the output port 2 and a transmission path from the input port 2 to the output port 3 are currently established, and it is assumed that the idle optical switch 9 works in a bar state, a signal transmitted from the input port 1 to the output port 3 through optical switch 1→optical switch 9→optical switch 17→optical switch 23 is level-2 crosstalk. If a transmission path from the input port 1 to the output port 4 needs to be established in this case, states of the optical switch 1, the optical switch 9, and an optical switch 24 need to be adjusted from the bar state to the cross state (i.e., 0→1). According to the present disclosure, a transmission path establishment process is as follows. First, the gate device 84 that is coupled to the input port (the internal input port) 1 is controlled to be in the close state, and the optical signal input from the input port (internal input port) 1 of the optical switch matrix 82 is particularly small, for example, −20 dBm. Then, the states of the optical switch 1, the optical switch 9, and the optical switch 24 are adjusted. In the present disclosure, even if the state of the optical switch 1 is adjusted earlier than that of the optical switch 9 in the adjustment process, crosstalk from the input port 1 and at the output port (the internal output port) 3 is still level-2 crosstalk. An optical gate of the gate device 84 that is coupled to the input port (the internal input port) 1 is opened after the states of all the optical switches 1, 9, and 24 are adjusted. After a path is established, the crosstalk from the input port (the internal input port) 1 and at the output port 3 is still level-2 crosstalk. Therefore, the dynamic crosstalk can be reduced in the entire transmission path establishment process.

Figure 8:
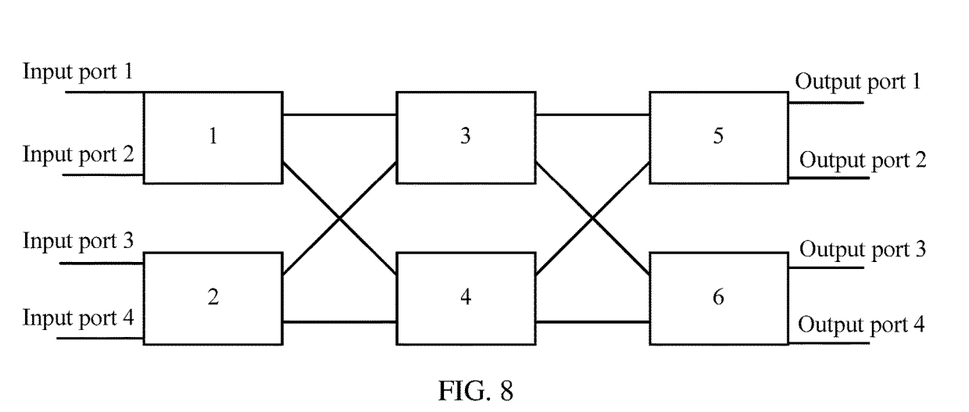
FIG. 8 is an example of a diagram of a 4×4 optical switch matrix in a Benes structure.

In this embodiment of the present disclosure, the optical switch matrix 82 may be an M×N optical switch matrix in any existing topology. For example, the optical switch matrix 82 may be the optical switch matrix in the Banyan structure shown in FIG. 1, or may be an optical switch matrix in a Benes structure shown in FIG. 8.

Figure 9:
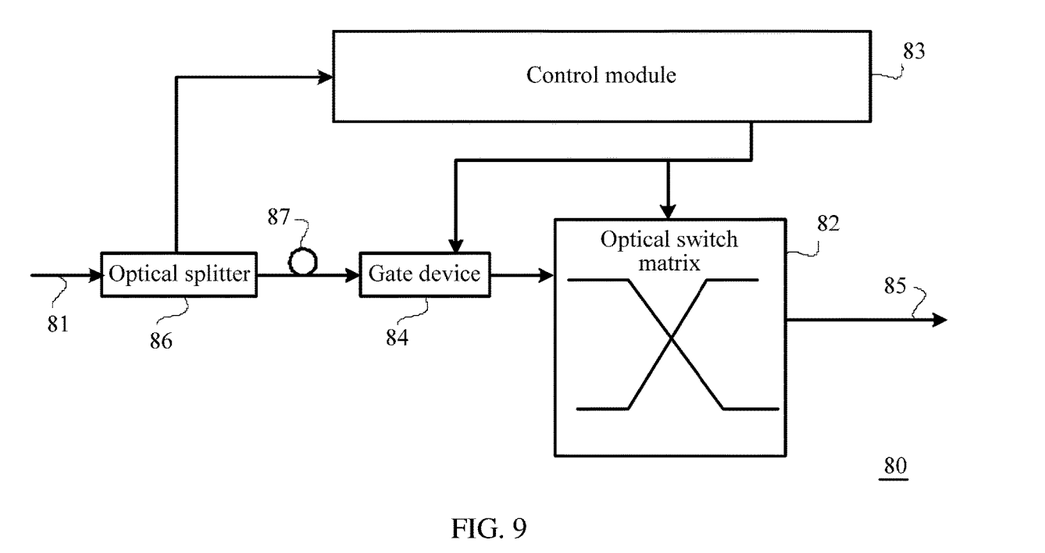
FIG. 9 is a schematic structural diagram of Embodiment 2 of an apparatus for establishing a transmission path according to the present disclosure.

FIG. 9 is a schematic structural diagram of Embodiment 2 of an apparatus 80 for establishing a transmission path according to the present disclosure. Based on the embodiment shown in FIG. 7, as shown in FIG. 9, the apparatus 80 for establishing a transmission path may further include an optical splitter 86. The optical splitter 86 may be configured to obtain a first optical signal and a second optical signal that have preset powers from the optical signal by means of splitting. The first optical signal is transmitted to the control module 83, and the second optical signal is transmitted to the gate device 84 using an optical delay line 87.

This embodiment provides a structure of the optical switch control apparatus for exchanging an optical signal. Before optical switching is performed on an optical signal from a transmit end, that is, a to-be-exchanged optical signal, a first optical signal having a preset power is first obtained by means of splitting using the optical splitter 86, and is input to the control module 83. For example, the first optical signal is an optical signal whose power is approximately 5% or 10% of a power of the optical signal.

In this embodiment, when the control module 83 obtains the transmission path of the optical signal in the optical switch matrix 82 according to the external input port 81 and the external output port 85 of the optical signal, the control module 83 is further configured to determine the external input port 81 according to a connection port between the control module 83 and the external input port 81, read the optical identifier of the first optical signal, determine the external output port 85 according to the optical identifier, and obtain the transmission path of the optical signal in the optical switch matrix 82 according to the external input port 81 and the external output port 85. The control module 83 may obtain the transmission path in multiple manners. For the manners, refer to other approaches for determining a transmission path in an optical switch matrix, and details are not described herein.

Figure 10:
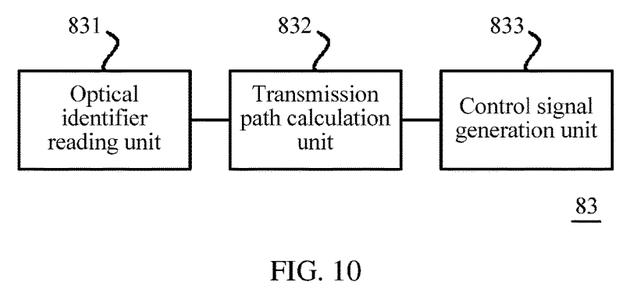
FIG. 10 is a schematic structural diagram of a control module in an apparatus for establishing a transmission path according to the present disclosure.
Figure 11A:
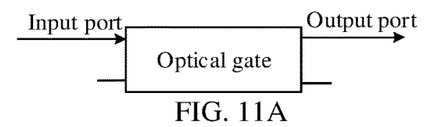
FIG. 11A, FIG. 11B, FIG. 11C and FIG. 11D are schematic structural diagrams of an optical gate in an apparatus for establishing a transmission path according to the present disclosure.
Figure 11B:
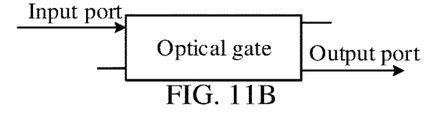
Figure 11C:
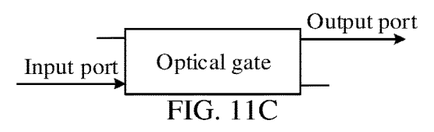
Figure 11D:
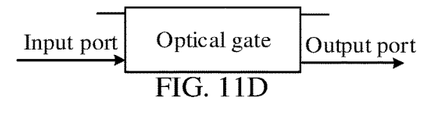

In an example, as shown in FIG. 10, the control module 83 includes an optical identifier reading unit 831, a transmission path calculation unit 832, and a control signal generation unit 833. The optical identifier reading unit 831 is configured to determine the external input port 81 according to the connection port between the control module 83 and the external input port 81, read the optical identifier of the first optical signal, and determine the external output port 85 of the first optical signal according to the optical identifier. The transmission path calculation unit 832 is configured to obtain the transmission path of the optical signal in the optical switch matrix 82 according to the external input port 81 and the external output port 85. The control signal generation unit 833 is configured to generate a control signal. The control signal includes a first control signal, a second control signal, and a third control signal.

In an embodiment, the gate device 84 may be an optical gate. Further, the optical gate may be implemented using a semiconductor optical amplifier (SOA) and/or an optical switch. A quantity of optical gates is the same as a quantity of internal input ports of the optical switch matrix 82. The optical gates are in a one-to-one correspondence with the internal input ports of the optical switch matrix 82. That is, one optical gate is disposed in front of each internal input port of the optical switch matrix 82.

The SOA may amplify or absorb an optical signal under different drive signals, has a particularly rapid adjustment speed, and may work in an order of magnitude of a nanosecond or a sub-nanosecond. That the gate device 84 is in a close state is equivalent to that the SOA absorbs an optical signal, and that the gate device is in an open state is equivalent to that the SOA amplifies the optical signal.

When an optical switch is used as an optical gate, the optical gate may use manners shown in FIGS. 11A-11D. As shown in FIGS. 11A-11D, any one of input ports and any one of output ports of a 2×2 optical switch are not connected, only one of the input ports is connected to an optical delay line, and one of the output ports is connected to an input port of an optical switch matrix. In connection manners shown in FIGS. 11A and 11D, that the optical switch works in a bar state is equivalent to that the optical gate works in an open state, and that the optical switch works in a cross state is equivalent to that the optical gate works in a close state. In connection manners shown in FIGS. 11B and 11C, that the optical switch works in the cross state is equivalent to that the optical gate works in the open state, and that the optical switch works in the bar state is equivalent to that the optical gate works in the close state. In addition, to reduce a transmission path establishment time, some special designs may be performed on the 2×2 optical switch used as the optical gate to reduce a state adjustment time needed by the 2×2 optical switch as much as possible such that a state switching speed of the optical switch used as the optical gate is faster than a state switching speed of the optical switch in the optical switch matrix. For example, in some application scenarios, the optical switch in the optical switch matrix uses a thermo-optical switch, and a state adjustment time of the thermo-optical switch is in an order of magnitude of microsecond (μs). The optical switch used as the optical gate may use an electro-optic switch, and a state adjustment time of the electro-optic switch is in an order of magnitude of nanosecond. Using the design or the SOA, a time for establishing the entire transmission path may be far less than that in other approaches.

Figure 12:
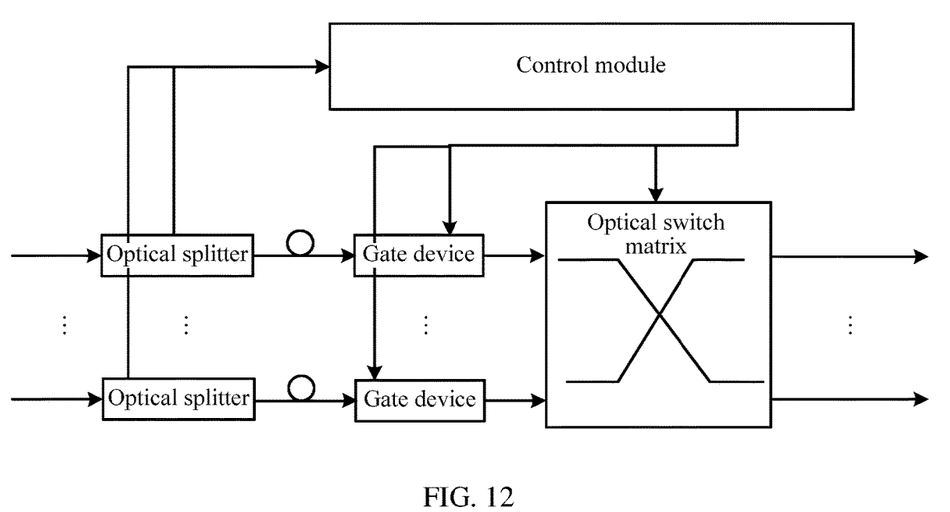
FIG. 12 is a schematic structural diagram of Embodiment 3 of an apparatus for establishing a transmission path according to the present disclosure.

In addition, as shown in FIG. 12, the apparatus for establishing a transmission path for exchanging an optical signal may include multiple external input ports and multiple external output ports. In the scenario, a quantity of optical splitters, a quantity of optical delay lines and a quantity of gate devices may be the same as a quantity of the external input ports. That is, each external input port separately corresponds to one optical splitter, one optical delay line and one gate device.

Further, the optical switch used as the optical gate and the optical switch matrix may be disposed integrally. For example, the optical switch used as the optical gate and an optical switch in the optical switch matrix may be integrated into a chip to improve an integration level of the apparatus.

In another embodiment, a gate device may be a power equalizer. A quantity of power equalizers is the same as a quantity of internal input ports of the optical switch matrix. The power equalizers are in a one-to-one correspondence with the internal input ports of the optical switch matrix. That is, one power equalizer is disposed in front of each internal input port of the optical switch matrix.

In some application scenarios, a power equalization function needs to be provided when optical switching is performed. In this case, an existing power equalizer in an optical switching device may be used, an optical gate does not need to be added, and the power equalizer and a state of the optical switch matrix are controlled properly to reduce dynamic crosstalk caused by transmission path establishment.

Figure 13:
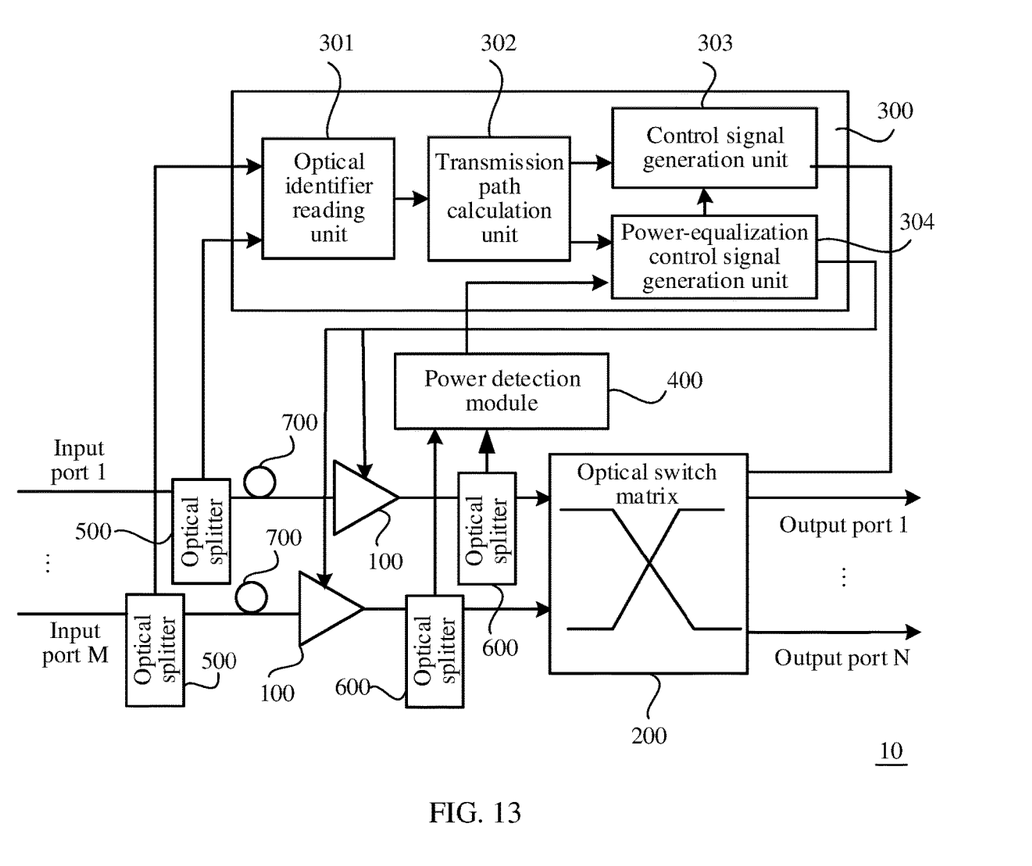
FIG. 13 is a schematic structural diagram of Embodiment 4 of an apparatus for establishing a transmission path according to the present disclosure.

FIG. 13 shows a structure of an apparatus 10 that is for establishing a transmission path and that has a power equalization function. The apparatus 10 for establishing a transmission path includes a power equalizer 100, a control module 300, a power detection module 400, an optical switch matrix 200, an optical splitter 500, an optical splitter 600, and an optical delay line 700. Exchange of one optical signal is described herein. Before an optical signal (a to-be-exchanged signal) input from an input port (an external input port) 1 is exchanged, a first optical signal of a preset power, for example, an optical signal of approximately 10%, is first obtained by means of splitting using the optical splitter 500, and is input to the control module 300. An optical identifier reading unit 301 in the control module 300 completes reading an optical identifier according to the input first optical signal, and determines an external output port of the first optical signal. In this embodiment, it is assumed that the external output port is an output port N. Then, a transmission path calculation unit 302 in the control module 300 calculates a transmission path, and determines a first optical switch (not shown) used on the transmission path in the optical switch matrix 200. Finally, a power-equalization control signal generation unit 304 and a control signal generation unit 303 respectively control a state of the power equalizer 100 and a state of the first optical switch in the optical switch matrix 200 in a time sequence, thereby establishing a corresponding transmission path and implementing power equalization of the optical signal.

The power-equalization control signal generation unit 304 generates a control signal for the power equalizer 100 that is coupled to the input port (the external input port) 1 such that the power equalizer 100 attenuates the input optical signal. When the power detection module 400 detects that a power of a signal output from the power equalizer 100 is less than a specified threshold, the control signal generation unit 303 is triggered by the power-equalization control signal generation unit 304 to generate a control signal for the optical switch matrix 200 to control the first optical switch to work in an expected state. Finally, after the state adjustment of the first optical switch is completed, the power-equalization control signal generation unit 304 generates a control signal for the power equalizer 100 that is coupled to the input port (the external input port) 1 such that the power equalizer 100 amplifies the input optical signal to an expected state, thereby completing power equalization of the optical signal and establishment of the transmission path.

The optical signal first is delayed using the optical delay line 700, and then is amplified to an expected strength using the power equalizer 100. Finally, the amplified optical signal is output from the output port N after passing through the transmission path established in the optical switch matrix 200.

Compared with an embodiment in which a gate device is implemented using an optical gate, in this embodiment, an existing power equalizer is used, and no additional hardware resource needs to be added such that implementation is effortless.

Figure 14:
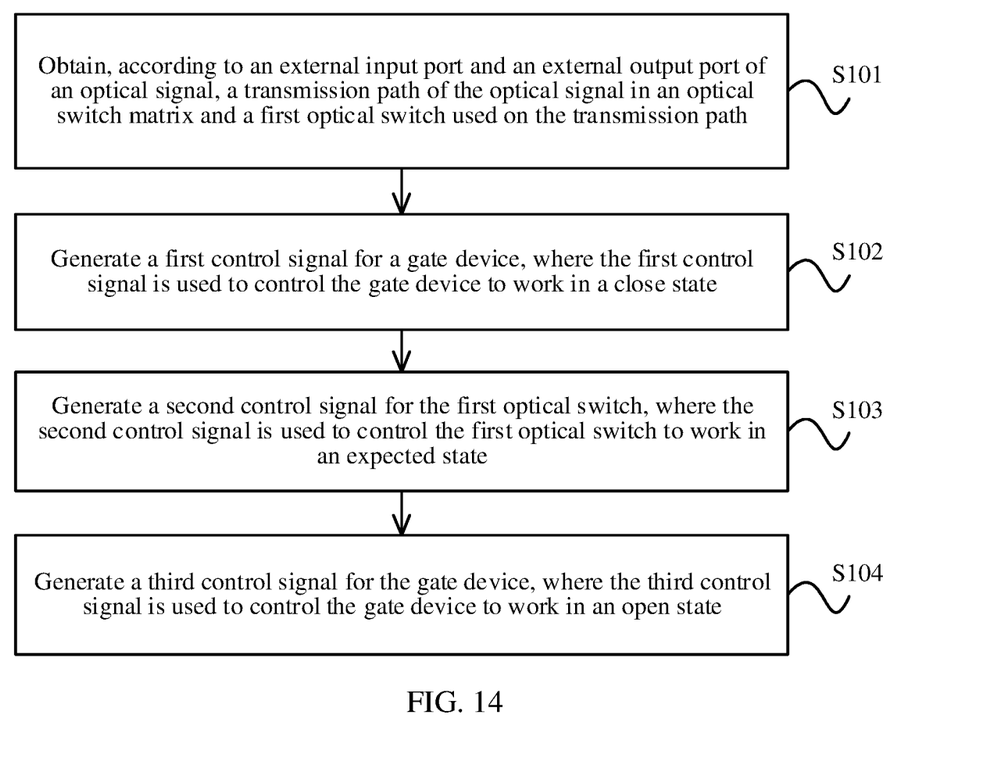
FIG. 14 is a flowchart of Embodiment 1 of a method for establishing a transmission path according to the present disclosure.

FIG. 14 is a flowchart of Embodiment 1 of a method for establishing a transmission path for exchanging an optical signal of the present disclosure. This embodiment of the present disclosure provides the method for establishing a transmission path for exchanging an optical signal. A transmission path of an optical signal is established by changing a state of an optical switch in an optical switch matrix. In this embodiment, the optical signal reaches the optical switch matrix through a gate device. The optical signal is prohibited from passing through the gate device when the gate device works in a close state. The optical signal is allowed to pass through the gate device when the gate device works in an open state. The method may be performed by any apparatus for establishing a transmission path for exchanging an optical signal in the embodiments of the present disclosure.

As shown in FIG. 14, the method for establishing a transmission path for exchanging an optical signal includes the following steps.

Step S101: Obtain, according to an external input port and an external output port of the optical signal, the transmission path of the optical signal in the optical switch matrix and a first optical switch used on the transmission path.

Step S102: Generate a first control signal for the gate device, where the first control signal is used to control the gate device to work in the close state.

Step S103: Generate a second control signal for the first optical switch, where the second control signal is used to control the first optical switch to work in an expected state.

Step S104: Generate a third control signal for the gate device, where the third control signal is used to control the gate device to work in the open state.

With reference to FIG. 7, first, the control module 83 obtains the external output port 85 of the optical signal input from the external input port 81. Then, the control module 83 calculates the transmission path, and obtains the first optical switch (not shown) used on the transmission path from the external input port 81 to the external output port 85. The control module 83 generates the first control signal for the gate device 84 such that the gate device 84 works in the close state. That is, the gate device 84 prevents the input optical signal from being transmitted to the external output port 85, or enables the input optical signal to be transmitted to the external output port 85 at a large loss. After the state of the gate device 84 is adjusted, the control module 83 further generates the second control signal for the optical switch matrix 82 to control the first optical switch to work in the expected state. Finally, after the state of the first optical switch is adjusted, the control module 83 generates a third control signal for the gate device 84 such that the gate device 84 works in the open state. That is, the gate device 84 transmits the input optical signal to the external output port 85 at a minimum loss.

Using the method for establishing a transmission path for exchanging an optical signal, dynamic crosstalk introduced in the transmission path establishment process can be reduced. For a specific embodiment, refer to the foregoing corresponding descriptions in FIG. 6, and details are not described herein again.

In this embodiment of the present disclosure, a gate device is disposed in front of an optical switch matrix. That is, an optical signal reaches the optical switch matrix through the gate device. A working state of the gate device and a working state of a first optical switch used for transmitting the optical signal in the optical switch matrix are adjusted in a time sequence such that when a transmission path used for transmitting the optical signal in the optical switch matrix is switched, dynamic crosstalk can be reduced, and communication quality is improved.

Before step S101, the method for establishing a transmission path may further include obtaining a first optical signal and a second optical signal that have preset powers from the optical signal by means of splitting. In this case, step S101 may include determining the external input port according to a connection port between the control module and the external input port, reading an optical identifier of a first optical signal, determining the external output port according to the optical identifier, and obtaining the transmission path of the optical signal in the optical switch matrix according to the external input port and the external output port.

Further, with reference to FIG. 9, the apparatus 80 for establishing a transmission path may obtain, by means of splitting using the optical splitter 86, the first optical signal and the second optical signal that have preset powers from the optical signal input from the external input port 81. The first optical signal is transmitted to the control module 83 such that the control module 83 extracts the optical identifier from the first optical signal, thereby determining the external output port 85 of the optical signal. However, the present disclosure is not limited thereto. Other methods may be further used to determine an output port of an optical signal and are not listed one by one herein.

In the foregoing embodiment, the gate device 84 may be an optical gate. Further, the optical gate may use an SOA and/or an optical switch. A quantity of optical gates is the same as a quantity of internal input ports of the optical switch matrix 82. The optical gates are in a one-to-one correspondence with the internal input ports of the optical switch matrix 82. That is, one optical gate is disposed in front of each internal input port of the optical switch matrix 82.

The optical switch used as the optical gate and the optical switch in the optical switch matrix 82 are separately designed such that a state switching speed of the optical switch used as the optical gate is faster than a state switching speed of the optical switch in the optical switch matrix 82, thereby reducing a time consumed for establishing the transmission path.

In addition, the gate device 84 may be a power equalizer. A quantity of power equalizers is the same as the quantity of internal input ports of the optical switch matrix 82. The power equalizers are in a one-to-one correspondence with the internal input ports of the optical switch matrix 82. That is, one power equalizer is disposed in front of each internal input port of the optical switch matrix 82.

Figure 15:
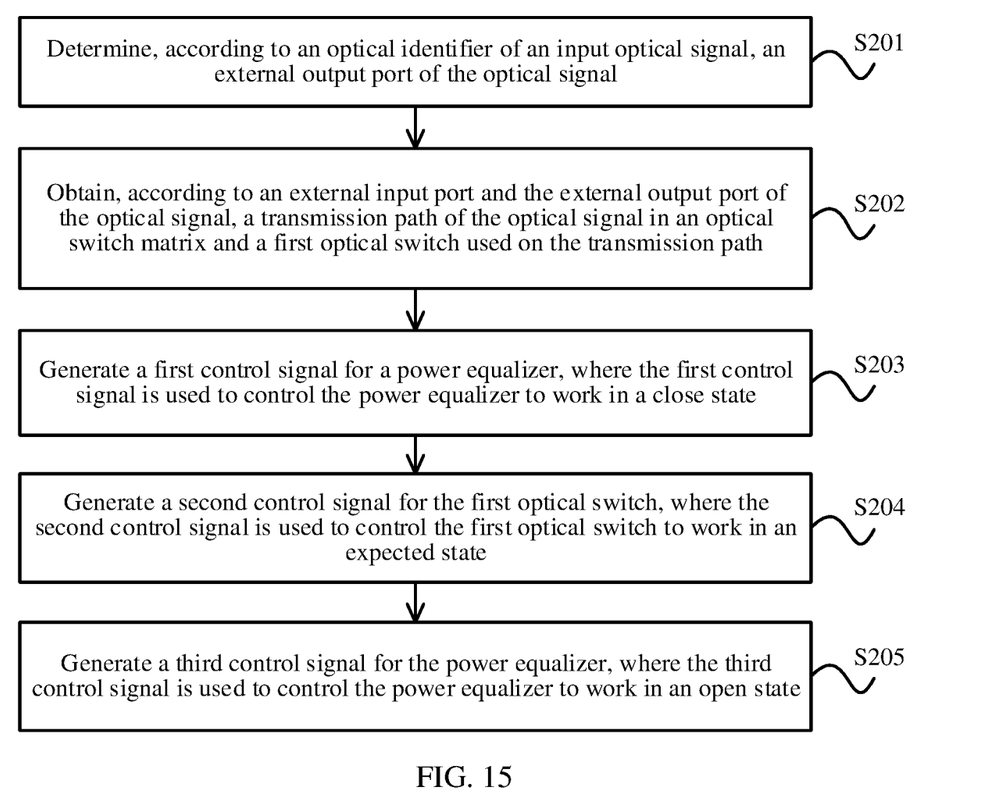
FIG. 15 is a flowchart of Embodiment 2 of a method for establishing a transmission path according to the present disclosure.

FIG. 15 shows a method for establishing a transmission path for exchanging an optical signal. As shown in FIG. 15, the method includes the following steps.

Step S201: Determine, according to an optical identifier of an input optical signal, an external output port of the optical signal.

Step S202: Obtain, according to an external input port and the external output port of the optical signal, a transmission path of the optical signal in an optical switch matrix and a first optical switch used on the transmission path.

Step S203: Generate a first control signal for a power equalizer, where the first control signal is used to control the power equalizer to work in a close state.

Step S204: Generate a second control signal for the first optical switch, where the second control signal is used to control the first optical switch to work in an expected state.

Step S205: Generate a third control signal for the power equalizer, where the third control signal is used to control the power equalizer to work in an open state.

With reference to FIG. 13, first, the optical identifier reading unit 301 reads an optical identifier of a first optical signal that is obtained after an optical signal input from the input port (the external input port) 1 is output from the optical splitter 500, and determines an output port N of the first optical signal. Then, the transmission path calculation unit 302 calculates a transmission path, and determines a first optical switch (not shown) used by the optical switch matrix 200 for establishing the transmission path from the input port (the external input port) 1 to the output port N. The power-equalization control signal generation unit 304 generates a control signal for the power equalizer 100 such that the power equalizer 100 attenuates an input second optical signal. When the power detection module 400 detects that a power of a signal output from the power equalizer 100 is less than a specified threshold, the control signal generation unit 303 generates a control signal for the optical switch matrix 200 to control the first optical switch to work in an expected state. Finally, after the state adjustment of the first optical switch is completed, the power-equalization control signal generation unit 304 generates a control signal for the power equalizer 100 such that the power equalizer 100 amplifies the input signal to an expected state, thereby completing power equalization of the optical signal input from the input port (the external input port) 1 and establishment of the transmission path of the optical signal.

Figure 16:
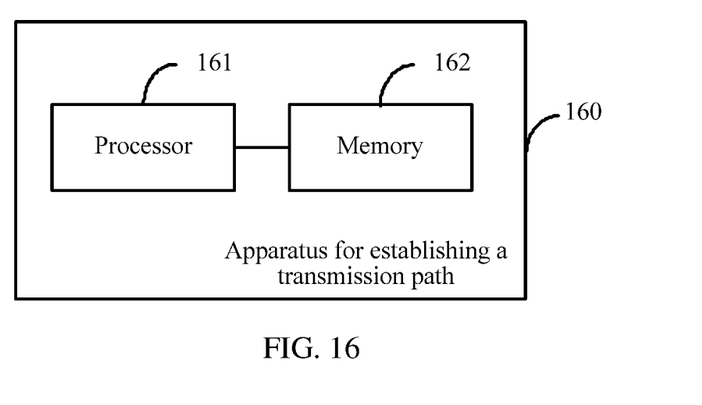
FIG. 16 is a schematic structural diagram of Embodiment 5 of an apparatus for establishing a transmission path according to the present disclosure.

FIG. 16 is a schematic structural diagram of Embodiment 5 of an apparatus 160 for establishing a transmission path according to the present disclosure. This embodiment of the present disclosure provides the apparatus 160 for establishing a transmission path for exchanging an optical signal. A transmission path for exchanging an optical signal is established by changing a state of an optical switch in an optical switch matrix. The optical signal reaches the optical switch matrix through a gate device. The optical signal is prohibited from passing through the gate device when the gate device works in a close state. The optical signal is allowed to pass through the gate device when the gate device works in an open state. The apparatus 160 for establishing a transmission path includes a processor 161 and a memory 162.

The memory 162 is configured to store an execution instruction. When the apparatus 160 for establishing a transmission path runs, the processor 161 communicates with the memory 162. The processor 161 calls the execution instruction in the memory 162 to perform the operations of obtaining, according to an external input port and an external output port of the optical signal, the transmission path of the optical signal in the optical switch matrix and a first optical switch used on the transmission path, generating a first control signal for the gate device, where the first control signal is used to control the gate device to work in the close state, generating a second control signal for the first optical switch, where the second control signal is used to control the first optical switch to work in an expected state, and generating a third control signal for the gate device, where the third control signal is used to control the gate device to work in the open state.

In this embodiment of the present disclosure, dynamic crosstalk introduced in a transmission path establishment process can be reduced. For a specific embodiment, refer to the foregoing corresponding descriptions in FIG. 6, and details are not described herein again.

Optionally, the processor 161 may be further configured to obtain a first optical signal and a second optical signal that have preset powers from the optical signal by means of splitting, and when obtaining, according to the external input port and the external output port of the optical signal, the transmission path of the optical signal in the optical switch matrix, the processor 161 may be further configured to determine the external input port according to a connection port between the processor and the external input port, read an optical identifier of the first optical signal, determine the external output port according to the optical identifier, and obtain the transmission path of the optical signal in the optical switch matrix according to the external input port and the external output port.

In an implementation, the gate device may be an optical gate, a power equalizer, or the like. Further, the optical gate may use an SOA, an optical switch, and/or the like. Optionally, a state switching speed of the optical switch used as the optical gate is faster than a state switching speed of the optical switch in the optical switch matrix.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An apparatus for establishing, by changing a state of an optical switch in an optical switch matrix, a transmission path for exchanging an optical signal, wherein the apparatus for establishing the transmission path comprises:
an external input port configured to input the optical signal;
an external output port coupled to an internal output port of the optical switch matrix and configured to output an exchanged optical signal;
a gate device comprising a power equalizer, wherein an input port of the gate device is coupled to the external input port, wherein an output port of the gate device is coupled to an internal input port of the optical switch matrix, and wherein the gate device is configured to:
prohibit the optical signal from passing through the gate device when the gate device works in a closed state; and
allow the optical signal to pass through the gate device when the gate device works in an open state; and
a controller comprising an input port coupled to the external input port, wherein the controller is configured to obtain the transmission path of the optical signal in the optical switch matrix according to the external input port and the external output port,
wherein the optical switch matrix further comprises a first optical switch on the transmission path, and wherein the optical switch matrix is configured to:
exchange the optical signal; and
obtain an exchanged optical signal from the exchange of the optical signal, and wherein the controller is further configured to:
generate a first control signal configured to control the gate device to work in the closed state;
generate a second control signal configured to control the first optical switch to work in an expected state; and
generate a third control signal configured to control the gate device to work in the open state.

2. The apparatus of claim 1, further comprising an optical splitter coupled to the controller and the gate device and configured to split the optical signal to obtain a first optical signal and a second optical signal comprising preset powers, wherein the first optical signal is transmitted to the controller, wherein the second optical signal is transmitted to the gate device using an optical delay line, and wherein the controller is configured to obtain the transmission path of the optical signal in the optical switch matrix by being further configured to:
obtain the external input port according to a connection port between the controller and the external input port;
read an optical identifier of the first optical signal;
obtain the external output port according to the optical identifier; and
obtain the transmission path of the optical signal in the optical switch matrix according to the external input port and the external output port.

3. An apparatus for establishing a transmission path for exchanging an optical signal by changing a state of an optical switch in an optical switch matrix, wherein the apparatus comprises:
a memory configured to store instructions; and
a processor coupled to the memory and configured to execute the instructions to cause the processor to:
obtain, according to an external output port and an external input port configured to input the optical signal, the transmission path of the optical signal in the optical switch matrix and a first optical switch used on the transmission path;
generate a first control signal for a gate device that comprises a power equalizer and that is coupled to the optical switch matrix between the external input port and the optical switch matrix, wherein the first control signal is configured to control the gate device to work in a closed state in which the optical signal is prohibited to pass through the gate device;
generate a second control signal for the first optical switch, wherein the second control signal is configured to control the first optical switch to work in an expected state; and
generate a third control signal for the gate device, wherein the third control signal is configured to control the gate device to work in an open state in which the optical signal is allowed to pass through the gate device.

4. The apparatus of claim 3, wherein the instructions, when executed by the processor, further cause the processor to be configured to obtain a first optical signal and a second optical signal that are obtained by splitting the optical signal and that have preset powers, and wherein the instructions, when executed by the processor, cause the processor to obtain the transmission path of the optical signal by causing the processor to be configured to:
determine the external input port according to a connection port between the processor and the external input port;
read an optical identifier of the first optical signal;
determine the external output port according to the optical identifier; and
obtain the transmission path of the optical signal in the optical switch matrix according to the external input port and the external output port.

5. An apparatus for establishing, by changing a state of an optical switch in an optical switch matrix, a transmission path for exchanging an optical signal, wherein the apparatus for establishing the transmission path comprises:
an external input port configured to input the optical signal;
an external output port coupled to an internal output port of the optical switch matrix and configured to output an exchanged optical signal;
a gate device comprising an input port coupled to the external input port, wherein an output port of the gate device is coupled to an internal input port of the optical switch matrix, and wherein the gate device is configured to:
prohibit the optical signal from passing through the gate device when the gate device works in a closed state; and
allow the optical signal to pass through the gate device when the gate device works in an open state;
a controller coupled to the external input port and configured to obtain the transmission path of the optical signal in the optical switch matrix according to the external input port and the external output port;
an optical splitter coupled between the gate device and the optical switch matrix; and
a power detector coupled to the optical splitter and configured to determine a power of the optical signal,
wherein the optical switch matrix further comprises a first optical switch on the transmission path, and wherein the optical switch matrix is configured to:
exchange the optical signal; and
obtain an exchanged optical signal from the exchange of the optical signal, and wherein the controller is further configured to:

generate a first control signal configured to control the gate device to work in the closed state;
generate a second control signal configured to control the first optical switch to work in an expected state; and
generate a third control signal configured to control the gate device to work in the open state.

6. The apparatus of claim 5, wherein the gate device comprises a power equalizer.

7. The apparatus of claim 6, wherein the power detector is configured to detect a power of a signal output by the power equalizer.

8. The apparatus of claim 7, wherein the power detector is further configured to determine whether the power of the signal output by the power equalizer satisfies a threshold.

9. The apparatus of claim 8, wherein the controller is configured to generate a control signal for the optical switch matrix when the power of the signal output by the power equalizer satisfies the threshold.

10. The apparatus of claim 9, wherein the optical switch matrix is configured to:
receive the control signal for the optical switch matrix; and
work in the expected state in response to receiving the control signal for the optical switch matrix.

* * * * *